Figure 1:
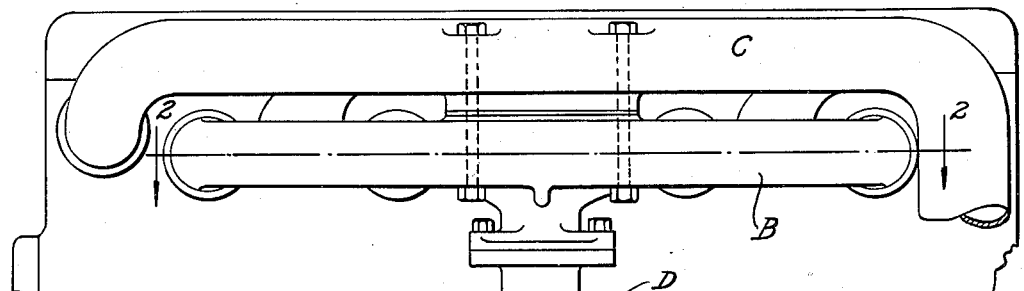

Dec. 29, 1936.  H. H. TIMIAN ET AL  2,065,630
ENGINE
Filed Aug. 9, 1933   2 Sheets-Sheet 1

INVENTORS.
Harold H. Timian
BY Enos R. Jacoby
ATTORNEY.

Dec. 29, 1936.  H. H. TIMIAN ET AL  2,065,630
ENGINE
Filed Aug. 9, 1933   2 Sheets-Sheet 2
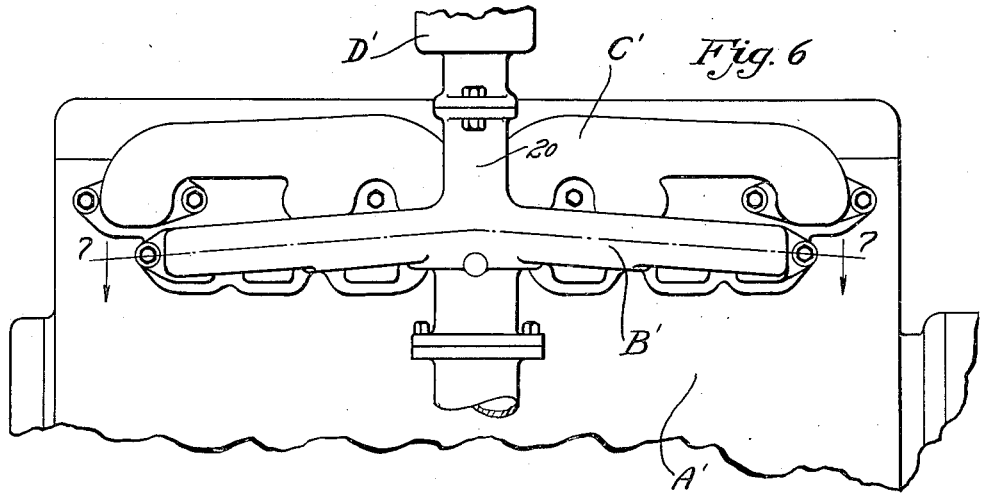
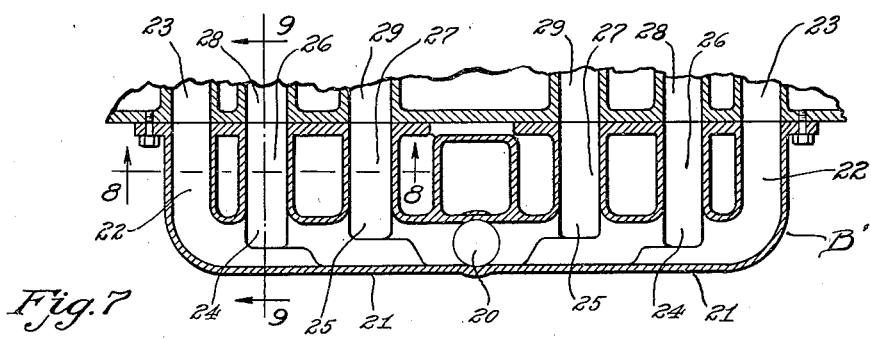
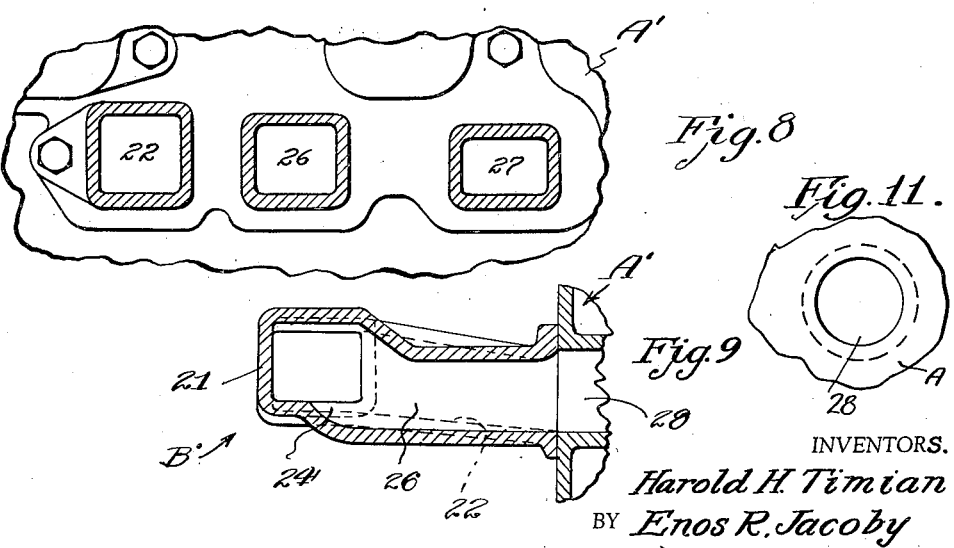
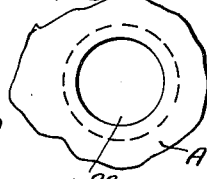
INVENTORS.
Harold H. Timian
BY Enos R. Jacoby
ATTORNEY.

Patented Dec. 29, 1936

2,065,630

UNITED STATES PATENT OFFICE 2,065,630

ENGINE

Harold H. Timian and Enos R. Jacoby, Detroit, Mich., assignors to Continental Motors Corporation, Detroit, Mich., a corporation of Virginia Application August 9, 1933, Serial No. 684,298

4 Claims. (Cl. 123—52)

Our invention relates to engines and more particularly to an intake manifold structure for a multi-cylinder internal combustion engine, with particular reference to fuel mixture distribution.

In an intake manifold structure having a plurality of port runners arranged for connecting a lateral fuel mixture conducting portion with the engine cylinders, it has been found that in some instances the pressure of the fuel mixture at the outlet of the end port runner is greater than the pressure at the outlet of the intermediate port runner due to the ramming of the gases which tend to relatively increase the pressure at the end runners with respect to said intermediate port runners, this unequal pressure tending to upset the uniform distribution of fuel mixture to the engine cylinders during engine operation.

It is an object of our invention to overcome the aforesaid difficulties in an intake manifold structure having a plurality of branches or port runners by providing a structure in which the pressure of the gases at the outlet of the intermediate port runners is relatively increased with the result that the pressure of the gases introduced into the engine cylinders from said port runners is substantially the same at the outlets of all of said port runners.

It is a further object of our invention to attain these results in a manner conductive to efficient engine performance by providing an intermediate port runner constructed in such a way as to act on the fuel mixture flowing therethrough to relatively increase the velocity thereof, this being preferably accomplished by providing an intermediate port runner with a cross-sectional area less than the cross-sectional area of the end port runner.

A still further object of our invention is to embody these principles of fuel mixture distribution in an intake manifold structure having an end port runner and a plurality of intermediate port runners, improved results being preferably obtained in an intake manifold structure of this character by providing these port runners with progressively increasing cross-sectional areas, the inner intermediate port runner having a cross-sectional area less than the cross-sectional area of the other intermediate port runner which is more remote from the primary fuel mixture conducting portion, both of said intermediate port runners having a cross-sectional area less than the end port runner.

A still further object of our invention is to facilitate the distribution of fuel mixture and fuel precipitate to a multi-cylinder in line engine by providing an intake manifold structure having end and intermediate port runners connecting the engine cylinders with a lateral fuel mixture conducting portion extending generally longitudinally of the engine, this manifold structure including a pair of substantially oppositely extending lateral fuel mixture conducting portions which are inclined to each other and to the longitudinal vertical plane of the engine whereby to provide a compact and efficient fuel mixture distributing manifold, the wet fuel being directed in a predetermined path longitudinally of said lateral fuel mixture conducting portions by means of a distributing groove or grooves adjacent the junction of said lateral conducting portions and the primary fuel mixture conducting portion.

Figure 2:
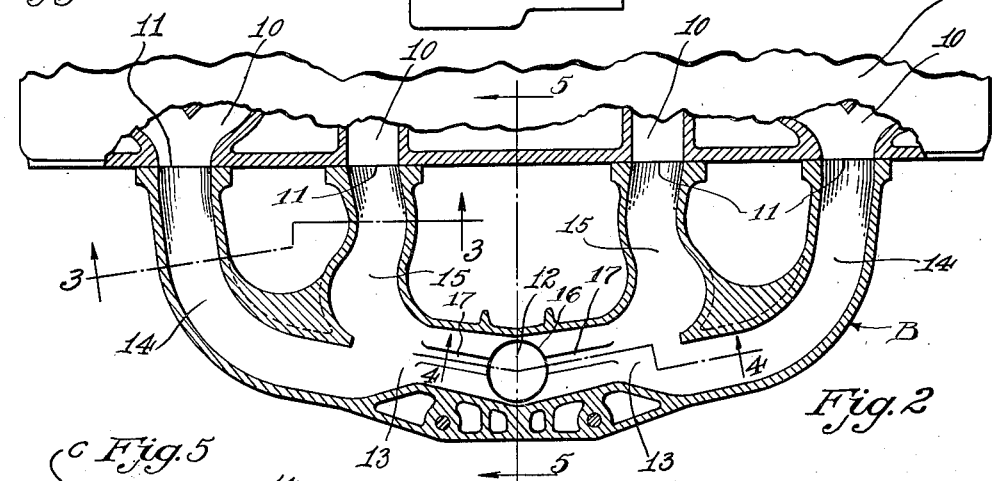
Figure 5:
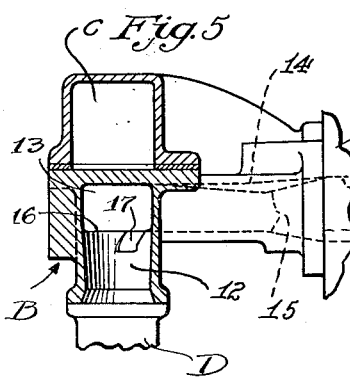
Figure 4:
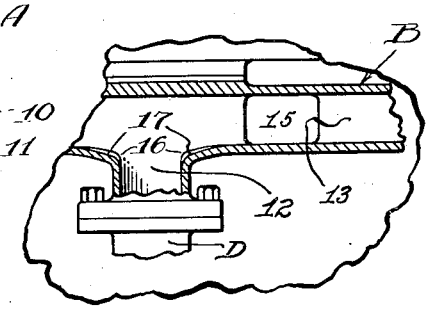
Figure 3:
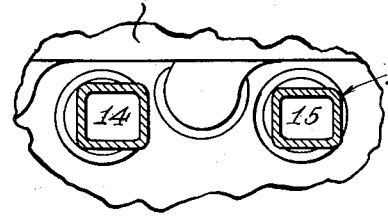

For a more detailed understanding of our invention reference may be had to the accompanying drawings which illustrate one form which our invention may assume, and in which:

Fig. 1 is a side elevational view of an internal combustion engine and showing a manifold structure assembled therewith, Fig. 2 is a horizontal sectional view through such intake manifold structure and taken substantially on the line 2—2 of Fig. 1, Fig. 3 is a detail sectional view taken substantially on the line 3—3 of Fig. 2, Fig. 4 is a detail vertical sectional view through the intake manifold structure at the junction of the primary and lateral fuel mixture conducting portions and taken substantially on the line 4—4 of Fig. 2, Fig. 5 is a vertical transverse sectional view taken substantially on the line 5—5 of Fig. 2 and showing the manner in which the intermediate port runner is constructed to provide for a cross-sectional area at a critical point intermediate the engine cylinders and lateral conducting portion which is less than the cross-sectional area at the critical point of an end port runner, Fig. 6 is a side elevational view of an engine having an intake manifold structure assembled therewith and commonly referred to as a six port manifold, but constructed to embody the principles of our invention as incorporated in the manifold structure illustrated in Figs. 1 to 5 inclusive.

Figure 10:
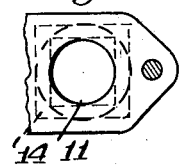

Fig. 7 is a horizontal sectional view of this modified type of intake manifold structure and taken on the line 7—7 of Fig. 6, Fig. 8 is an enlarged detail vertical sectional view through the port runners taken substantially on the line 8—8 of Fig. 7 and showing the relative cross-sectional areas of said port runners, Fig. 9 is a transverse sectional view taken substantially on the line 9—9 of Fig. 7, Fig. 10 is a detail view of runner outlet of the manifold illustrated in Fig. 2, and Fig. 11 is a detail view of the circular cylinder intake port.

Figs. 1 to 5 inclusive illustrate one form of our invention and illustrate a fuel mixture distributing means associated with an engine A having a plurality of aligned cylinders (not shown), the engine being provided with suitable intake passages 10 adapted for communication with said cylinders and communicating with the intake ports 11 in the engine block. I have provided an intake manifold structure B which may be secured to the engine block in the usual manner, the usual exhaust manifold structure C being secured to the engine in the usual manner.

This intake manifold structure comprises a primary fuel mixture conducting portion 12 extending generally upwardly from the carburetor D for conducting the fuel mixture from the carburetor outlet to the longitudinally extending lateral fuel mixture conducting portions 13, which preferably are arranged to extend in opposite directions from the primary conducting portion as shown in Fig. 2. Each of said lateral fuel mixture conducting portions 13, terminate in outlets and associated with said outlets are the end and intermediate port runners 14 and 15 respectively, said port runners respectively connecting the end and intermediate outlets of the lateral conducting portions with the end and intermediate intake ports 11 of the engine block.

The lateral conducting portions 13 are inclined or sloped towards the engine, i. e., the lateral conducting portions are inclined to each other and that portion at the junction of the lateral and primary conducting portions is laterally spaced a greater distance from the engine block than that portion more remote from the said junction of said conducting portions (see Fig. 2). The primary and lateral conducting portions are connected by a bend 16, and preferably a groove 17 or other suitable fuel distributing means is provided at the bend to control wet fuel distribution by controlling the wet fuel flow longitudinally of the lateral conducting portion beyond the bend.

In an intake manifold structure of this character the flow of gases therein produces a ramming effect in the end port runner and tends to provide a greater pressure of the gases at the outlet of the end port runner than at the outlet of the intermediate port runner, and in order to obtain balanced pressures at the outlet of all of said port runners, we find that it is necessary to provide a construction in which the velocity of the gases flowing through the intermediate port runners be increased, and this is preferably accomplished as shown in the illustrated embodiment of our invention by relatively decreasing the cross-sectional area of the intermediate port runner with respect to the cross-sectional area of the end port runner. It will be noted that the lateral fuel mixture conducting portion is preferably constructed substantially rectangular in cross-section and the outlets thereof are likewise substantially rectangular in cross-section for registration with the end and intermediate port runners which are also substantially rectangular in cross-section. In order to progressively decrease the cross-sectional area of the intermediate port runner 15, I have preferably provided a construction in which a pair of walls of said intermediate port runner are arranged to converge, preferably the top wall being inclined towards the bottom wall as clearly shown in Fig. 5, the converging of these walls terminating at a point, which we term a critical point that is spaced from the outlet of the port runners but is located substantially adjacent the said port runner outlets. The section lines 3—3 are taken substantially at this critical point and it will be noted that the cross-section of the intermediate port runner at the point where the section line 3—3 crosses, is less than the cross section of the end port runner in area. It will be noted that the said intermediate and end port runners at this point are substantially the same in width, but the height of the intermediate port runner at this point is less than the height of the end port runner. A further feature of the manifold construction as herein illustrated is that the port runners beyond the critical point as designated by the section line 3—3 are merged into a substantially circular cross-section.

The progressive decrease in cross-sectional area of the intermediate port runner with respect to the end port runner acts on the fuel mixture flowing through said intermediate port runner and effects an increase in velocity of the gases, this increase in velocity tending to increase the impact pressure of the gases at the intermediate port runner outlet and thus the pressure of the gases at the outlet of the intermediate port runner is substantially the same as the pressure of the gases at the outlet of the end port runner.

The intake manifold structure as illustrated in Figs. 1 to 5 inclusive is especially designed for assembly with a six cylinder in-line engine, but obviously the principles of my invention may be incorporated in manifold structures adapted for assembly with engines other than those of the six cylinder in line type. In the manifold structure as discussed above it will be noted that the end port runner 14 is constructed for association with a Siamese cylinder intake port, while in the modified construction illustrated in Figs. 6 to 8 inclusive it will be noted that the engine is provided with an intake port for each cylinder and the intake manifold structure is provided with a port runner communicating with each cylinder intake port. Though applicants have selected for purposes of illustration to show their invention incorporated with engines of the six cylinder type, it is obviously understood that the invention is not limited to an engine of any particular number of cylinders, since the principles of the invention as illustrated in connection with both the manifold structures shown may be incorporated in manifold structures adapted for assembly with engines other than those of the six cylinder type as illustrated.

In Fig. 6 we have illustrated an engine A' having an associated carburetor structure D', an associated intake manifold structure B', and an exhaust manifold structure C'. In Figs. 1 to 5 inclusive we have shown a manifold structure as being incorporated with a carburetor of the up-draft type while in Figs. 6 to 9 inclusive the modified manifold structure is shown as being assembled with a carburetor of the down-draft type. Obviously either of the manifold structures shown may be assembled and cooperated with carburetors of either the up-draft or down-draft type as desired.

The intake manifold structure B' as herein illustrated includes a primary fuel mixture conducting portion 20 extending generally downwardly from the carburetor D' to the lateral fuel mixture conducting portions 21, the illustrated embodiment of our invention showing a pair of oppositely extending lateral fuel mixture conducting portions which extend generally longitudinally of the engine. Each of these lateral conducting portions terminate into the end port runners 22 for connecting said lateral conducting portion to the intake passages 23 associated with the end cylinders of the engine.

The intake manifold structure has disposed along its length a plurality of intermediate outlets 24 and 25 in each of said lateral fuel mixture conducting portions 21. The said intake manifold structure includes the intermediate port runners 26 and 27 respectively connecting the intermediate outlets 24 and 25 with the intermediate circular intake passages 28 and 29 of the engine block.

It will be noted from examination of Figs. 8 and 9 that the cross-sectional area of the intermediate port runners 26 and 27 is less than the cross-sectional area of the end port runners 22. Furthermore, it will be noted that the intermediate port runner 27 is less in cross-sectional area than the intermediate port runner 26, the intermediate port runner that is closer to the junction of the lateral conducting portion and the primary conducting portion being the smallest in cross-sectional area, the cross-sectional area of said port runners being progressively increased with respect to each other as the same becomes more remote from the junction of said primary and lateral conducting portions.

It will be noted that the construction illustrated in Figs. 6 to 9 inclusive will effect substantially the same result as obtained with the construction illustrated in Figs. 1 to 5 inclusive, the pressure of the gases at the outlets of said port runners being substantially the same at all outlets due to the fact that the intermediate port runners in which a relatively less ramming effect is had than with the end port runner, are relatively reduced in cross-sectional area by progressively reducing the height of said port runners, thereby providing a construction in which the velocity of the gases flowing through said intermediate port runners is decreased substantially in a manner as is provided for in the construction illustrated in Figs. 1 to 5 inclusive.

In the individual port manifold structure as illustrated in Figs. 6 to 9 inclusive, it will be noted that the port runners open through the one side wall of the lateral conducting portion and in the bottom wall, the degree in which the port runners intersect the bottom wall being progressively increased as shown in Fig. 7 whereby to obtain an accurate distribution of the wet fuel flowing along the floor of the manifold structure. Preferably, dams or other suitable wet fuel distributing means are associated with the outlets 24 and 25 for further controlling wet fuel distribution. It may further be noted that the port runners 22, 26, and 27 of this modified construction are substantially rectangular in cross-section throughout their entire length and it will be noted that the floor portions of said port runners are substantially in the same common plane, the top wall of said port runners lying in different planes whereby to provide a port runner of such a construction that the heights are different while maintaining at all times substantially the same width.

It will be noted that the engine operation or performance is materially improved with an intake manifold structure of the character as shown, since a uniform distribution of the fuel mixture is obtained for conduction to the various engine cylinders by means of this invention which provides a structure in which the pressure of the gases at the port runner outlets is substantially the same for all outlets.

It will be apparent to those skilled in the art to which our invention pertains that various modifications and changes may be made therein without departing from the spirit of our invention or from the scope of the appended claims.

What we claim as our invention is:

1. An intake manifold structure for a multi-cylinder in line internal combustion engine including a primary fuel mixture conducting portion, a lateral fuel mixture conducting portion communicating with said primary conducting portion, said lateral conducting portion extending longitudinally of the engine and having end and intermediate outlet openings, and port runners connecting said outlet openings with the engine cylinders, said port runners being substantially rectangular in cross-section, and having different cross-sectional areas at a point intermediate the lateral conducting portion and the port runner outlet, the cross-sectional area of an intermediate port runner being less than the cross-sectional area of the end port runner at said point the port runners being substantially rectangular in cross-section in advance of said point and merging into a substantially circular outlet beyond said point.

2. An intake manifold structure for a multi-cylinder in line internal combustion engine including a primary fuel mixture conducting portion, a lateral fuel mixture conducting portion communicating with the primary conducting portion and extending longitudinally of the engine, said lateral conducting portion being constructed substantially rectangular in cross-section, said lateral conducting portion having substantially rectangular outlet openings of substantially the same cross-sectional area, end and intermediate port runners for respectively connecting the end and intermediate outlet openings of said lateral conducting portion with the engine cylinders, said intermediate port runner having a pair of converging walls terminating at a critical point adjacent the port runner outlet, whereby to provide a cross-sectional area at said critical point less than that of the end port runner.

3. An intake manifold structure for a multi-cylinder in line internal combustion engine including a primary fuel mixture conducting portion, a lateral fuel mixture conducting portion communicating with the primary conducting portion and extending longitudinally of the engine, said lateral conducting portion being constructed substantially rectangular in cross-section, said lateral conducting portion having substantially rectangular outlet openings of substantially the same cross-sectional area spaced longitudinally thereof to provide end and intermediate outlet openings, end and intermediate port runners for respectively connecting the end and intermediate outlet openings of said lateral conducting portion with the engine cylinders, said intermediate port runner having a pair of converging walls terminating at a critical point adjacent the port runner outlet, whereby to provide a cross-sectional area at said critical point less than that of the end port runner, said end port runner being rectangular in cross-section and having a substantially uniform cross-sectional area in advance of a critical point adjacent the port runner outlet, each of said port runners having a cross-section beyond the said critical point that progressively merges into a substantially circular cross-section at the port runner outlets.

4. An intake manifold structure for a multi-cylinder in line internal combustion engine including a primary fuel mixture conducting portion, a lateral fuel mixture conducting portion communicating with the primary conducting portion and extending longitudinally of the engine, said lateral conducting portion being constructed substantially rectangular in cross-section, said lateral conducting portion having substantially rectangular outlet openings of substantially the same cross-sectional area spaced longitudinally thereof whereby to provide end and intermediate outlet openings, end and intermediate port runners for respectively connecting the end and intermediate outlet openings of said lateral conducting portion with the engine cylinders, said intermediate port runner having a top wall inclined to the floor and converging towards said floor, the inclination of said top wall terminating at a critical point adjacent the port runner outlet, whereby to provide a cross-sectional area at said critical point less than that of the end port runner.

HAROLD H. TIMIAN.
ENOS R. JACOBY.